United States Patent [19]

Adkisson

[11] Patent Number: 5,590,304
[45] Date of Patent: Dec. 31, 1996

[54] CIRCUITS, SYSTEMS AND METHODS FOR PREVENTING QUEUE OVERFLOW IN DATA PROCESSING SYSTEMS

[75] Inventor: Richard W. Adkisson, Dallas, Tex.

[73] Assignee: Covex Computer Corporation, Richardson, Tex.

[21] Appl. No.: 258,761

[22] Filed: Jun. 13, 1994

[51] Int. Cl.⁶ .................................................. G06F 13/16
[52] U.S. Cl. .................... 395/427; 395/477; 395/800; 395/557
[58] Field of Search ...................... 395/425, 800, 395/550, 500, 478, 325; 364/DIG. 1; 370/94.1, 85.6

[56] References Cited

U.S. PATENT DOCUMENTS

| | | | |
|---|---|---|---|
| 3,675,217 | 7/1972 | Dauber et al. | 340/172.5 |
| 4,156,798 | 5/1979 | Doelz | 179/15 AL |
| 4,674,034 | 6/1987 | Iwashita et al. | 364/DIG. 1 |
| 4,914,653 | 4/1990 | Bishop et al. | 370/85.6 |
| 5,023,776 | 6/1991 | Gregor | 364/DIG. 1 |
| 5,077,686 | 12/1991 | Rubinstein | 395/550 |
| 5,241,541 | 8/1993 | Farrell et al. | 370/94.1 |
| 5,307,467 | 4/1994 | Kitazawa | 395/325 |
| 5,432,918 | 7/1995 | Stamm | 395/425 |
| 5,432,920 | 7/1995 | Yazawa et al. | 395/425 |
| 5,509,136 | 4/1996 | Korekata et al. | 395/478 |

*Primary Examiner*—Alyssa H. Bowler
*Assistant Examiner*—Walter D. Davis

[57] ABSTRACT

A processing system is provided which includes circuitry for generating memory requests at a first clock rate. Input queuing circuitry which includes at least one queue receives the memory requests from the circuitry at the first clock rate and outputs such memory requests at a second clock rate. A memory system stores and retrieves data in response to the memory requests, the memory system outputting data in response to read requests received from input queuing circuitry. An output queue is provided which receives data output from memory at the second clock rate and outputs such data at the first clock rate. Queuing control circuitry is provided which prevents overflow of output queue by controlling the number of memory requests sent in bursts from the input queuing system to the memory system and by controlling the wait time between such bursts.

30 Claims, 2 Drawing Sheets

CIRCUITS, SYSTEMS AND METHODS FOR PREVENTING QUEUE OVERFLOW IN DATA PROCESSING SYSTEMS

TECHNICAL FIELD OF THE INVENTION

The present invention relates in general to data processing systems and in particular to circuits, systems and methods for preventing queue overflow in data processing systems.

CROSSREFERENCE TO RELATED APPLICATIONS

The following copending and coassigned United States patent applications contain related information and is incorporated herein by reference:

U.S. patent application Ser. No. 08/161,937, Attorney's Docket No. C5488-P23US, entitled "Apparatus, Systems and Methods For Controlling Electronic Memories," and filed Dec. 3, 1993.

BACKGROUND OF THE INVENTION

Queues are often used in processing systems for controlling the flow of digital words of data and/or control information between processing circuits. In particular, queues are useful for interfacing circuits operating at different clock speeds. For example, if a source circuit is operating at a clock rate greater than that at which a corresponding receiving circuit is operating, a queue may be used to temporarily store words output from the source circuit until the receiving circuit is reading to input them. A queue may also be used when a source circuit is operating at a clock rate slower than the clock rate at which a corresponding receiving circuit is operating. In this case, as words are output from the source circuitry they are stored in the queue. Then, after a given number of words have been accumulated, output of stored words to the receiving device is enabled.

Typically, a queue is a first-in-first-out device which receives a sequence of words at its input, stores those words as needed, and then outputs the words in the same sequence received. Queues may be constructed in a number of ways, as is known in the art. For example, a queue may be constructed from a series of storage elements similar to a shift register in which data is simply shifted in order through a series of storage elements from input to output. Alternatively, a queue may be constructed as an array of storage elements with input and output pointers moved to store and retrieve data in sequence. When used in interfacing applications such as discussed above, provision is made such that the input of data is timed with the source device clock and the output of data is timed with the receiving device clock.

Significantly, a queue has a finite length; only a given number of words can be queued up at a given time before an overflow occurs. This limitation is usually due to restrictions on the amount of circuitry which is physically available to construct the queue. Thus, timing of the input and output of words from a queue becomes critical, especially in the case where data is received from the source circuit at a clock rate greater than that at which data is being output to the receiving device. The issue of queue overflow becomes even more critical in high performance processing systems where maximizing data/control word flow rates is essential.

Thus, the need has arisen for circuits, systems and methods for preventing queue overflow in high performance processing systems. In particular, a need has arisen for circuits, systems and methods for preventing overflow of queues used to interface circuits and/or subsystems operating at different clock rates. Such circuits, systems and methods should be adaptable to queues of varying lengths as dictated by the available queuing hardware. Further, these circuits, systems, and methods should not unnecessarily complicate the overall system or degrade performance and should be adapted for construction using available circuits and devices.

SUMMARY OF THE INVENTION

The principles of the present invention are preferably applied to circuits, systems, and methods for controlling the transfer of memory requests from an input queuing system to a memory unit. In particular, the principles of the present invention can be advantageously applied to prevent output queue overflow in data processing systems in which memory requests to a memory subsystem are queued in one or more input queues and data output from the memory unit as a result are queued in an output memory queue, especially when the output queue receives data from the memory unit at a rate greater than the rate at which the output queue outputs that data.

According to one embodiment of the present invention, a processing system is provided which includes circuitry for generating memory requests at a first clock rate. Input queuing circuitry, which includes at least one queue, receives the memory requests from the circuitry for generating at the first clock rate and outputs such memory requests at a second clock rate. A memory system is provided for storing and retrieving data in response to the memory requests retrieved from the input queuing circuitry, the memory system in particular outputting data at the second clock rate in response to read requests from the queuing circuitry. An output queue receives the data output from the memory at the second clock rate and then outputs such data at the first clock rate. Queuing control circuitry prevents overflow of the output queue by controlling a number of memory requests sent in bursts from the input queuing system to the memory system and by controlling the wait time between ones of such bursts.

According to a second embodiment of the present invention, circuitry is provided for controlling the transfer of memory requests from queuing circuitry to a memory, the memory operating in response to a memory clock of a selected memory clock rate. The circuitry for controlling includes a counter and control circuitry which operates in an idle state, a send state, and a wait state. In the idle state, the counter is cleared. The control circuitry shifts from the idle state to the send state when the queuing circuitry starts sending requests to the memory. In the send state, the count in the counter is incremented by a rate value, proportionate to the difference between an input rate at which the queuing circuitry receives memory requests and the memory clock rate, each time a read request is sent from the queuing circuitry to the memory. Also, in the send state, the count in the counter is decremented by one each time a read request is not sent from the queuing circuitry to the memory. The control circuitry shifts from the send state to the idle state when the queuing circuitry is done sending read memory requests to the memory and the count in the counter is less than or equal to an overhead value representing processing overhead time. The control circuitry shifts from the send state to the wait state when the queuing circuitry is done sending all memory requests to the memory and the count in the counter is greater than the overhead value. In the wait state, the count in the counter is decremented by one in response to the memory clock. The control circuitry shifts from the wait state to the idle state when the count in the counter decrements to a value less than or equal to the overhead value.

The principles of the present invention are also embodied in circuitry for controlling the transfer of memory requests from queuing circuitry to a memory, the memory operating in response to a memory clock. The circuitry includes a wait counter, a register for holding an I/O rate value, and a register for holding an overhead value. The I/O rate value is proportionate to the difference between an input rate at which the queuing circuitry receives memory requests and the memory clock rate. The overhead value represents processing overhead time. Also included is control circuitry which is operable in idle, send and wait states. In the idle state, the wait counter is cleared. The control circuitry shifts from the idle state to the send state when the queue circuitry starts sending requests to the memory. In the send state, the count in the wait counter is incremented by the I/O rate value with each read request sent from the queuing circuitry to the memory and is decremented by one with each non-read request sent from the queuing circuitry to the memory. The control circuitry shifts from the send state back to the idle state when the queuing circuitry is done sending read requests to the memory and the count in the wait counter is less than or equal to the overhead value. The control circuitry shifts from the send state to the wait state when the queuing circuitry is done sending memory requests to the memory and the count in the wait counter is greater than the overhead value. In the wait state, the count in the wait counter is decremented by one with each cycle of the memory clock. The control circuitry shifts from the wait state to the idle state when the count in the wait counter decrements to a value less than or equal to the overhead value.

The principles of the present invention are further embodied in methods for controlling the transfer of memory requests to a memory. In one method embodiment, a method is provided for controlling the transfer of memory requests from queuing circuitry to a memory, the queuing circuitry receiving memory requests at a first clock rate and outputting memory requests at a second clock rate. In an idle state, a counter associated with the queuing circuitry is cleared. The method continues by shifting from the idle state to a send state when the queuing circuitry start sending requests to the memory. In the send state, the count in the counter is incremented by a rate value proportionate to the difference between the first and second clock rates, when a read request is sent from the queuing circuitry to the memory. Also in the send state, the count in the counter is decremented by one when a read request is not sent from the queuing circuitry to the memory. The method continues with a shifting from the send state to the idle state when the queuing circuitry is done sending read memory requests to the memory and the count in the counter is less than or equal to an overhead value representing processing overhead time. The method also includes the step of shifting from the send state to a wait state when the queuing circuitry is done sending all memory requests to the memory and the count in the counter is greater than the overhead value. In the wait state, the count in the counter is decremented by one in response to the memory clock timing the operation of the memory. Shifting from the wait state to the idle state occurs when the count in the counter decrements to a value less than or equal to the overhead value.

The principles of the present invention provide for circuits, systems and methods having substantial advantages over the prior art. Such circuits, systems and methods prevent overflow of the queues often used to interface circuits and/or subsystems operating at different clock rates. In particular, these circuits, systems and methods are adaptable to queues of varying lengths, as dictated by the available hardware, and are adapted for the prevention of overflow in a queue remote from the associated queue control circuitry.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–4 of the drawings, in which like numbers designate like parts.

Figure 1:
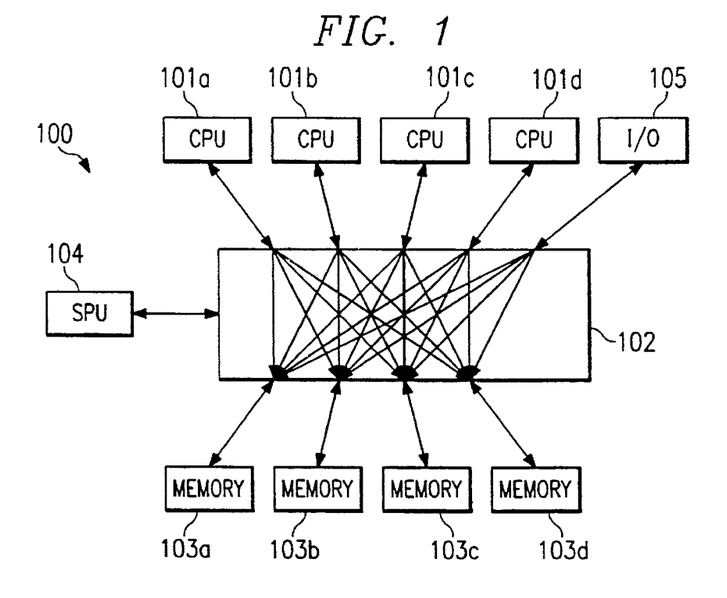
FIG. 1 is a high level block diagram of a processing system embodying the principles of the present invention.

FIG. 1 is a functional block diagram of a processing system 100 embodying the queue overflow prevention principles of the present invention. Processing system 100 includes a series of parallel central processing units (CPUs) 101$a$–101$d$, a crossbar 102, a series of parallel memory units 103$a$–103$d$, a service processor (SPU) 104, and an input/output (I/O) subsystem 105. In the illustrated embodiment, each central processing unit 101 is a scaler and vector processor. Crossbar 102 allows for the selective interconnection of a given one of the central processing units 101 and/or I/O subsystem 105 with a given one of the memory units 103. In the illustrated embodiment, crossbar 102 is memory address selective, and each memory unit 103 accommodates a different address range for the storage and retrieval of data. If a given CPU 101 requires the performance of a memory operation, that CPU 101 provides instructions designating a desired operating address space and crossbar 102 analyzes the instructions from the given CPU 101 and then controls the transfer of data to and from the corresponding memory unit 103. Service processor 104 is coupled to CPUs 101 through crossbar 102 and handles such functions as system initialization and fault detection/isolation. I/O subsystem 105 provides the requisite interface between system 100 and external devices such as disk drives, tape drives, networks, terminals and the like (not shown).

In the illustrated embodiment, a given CPU 101 or I/O subsystem 105 accesses a corresponding memory unit 103 by transmitting a memory request to crossbar 102. Crossbar 102 passes these memory requests along with memory request control signals, with clocks, clock control signals, and scan control signals to the memory units 103. A memory request from the crossbar 102 to the memory units 103 in the illustrated embodiment includes twenty-seven address bits, five bank select bits, a crossbar request bit along with its parity bit, two request type bits, eight zone bits, 64 bits of write data, eight write data parity bits and four control parity bits. For a more complete description of these memory requests and the hardware and methods used to access a given memory 103 in a preferred embodiment, reference is now made to copending and coassigned patent application Ser. No. 08/161937, attorney's docket number C5488-P23US, entitled "Apparatus, Systems and Methods For Controlling Electronic Memories," and filed Dec. 3, 1993, incorporated herein by reference.

Figure 2:
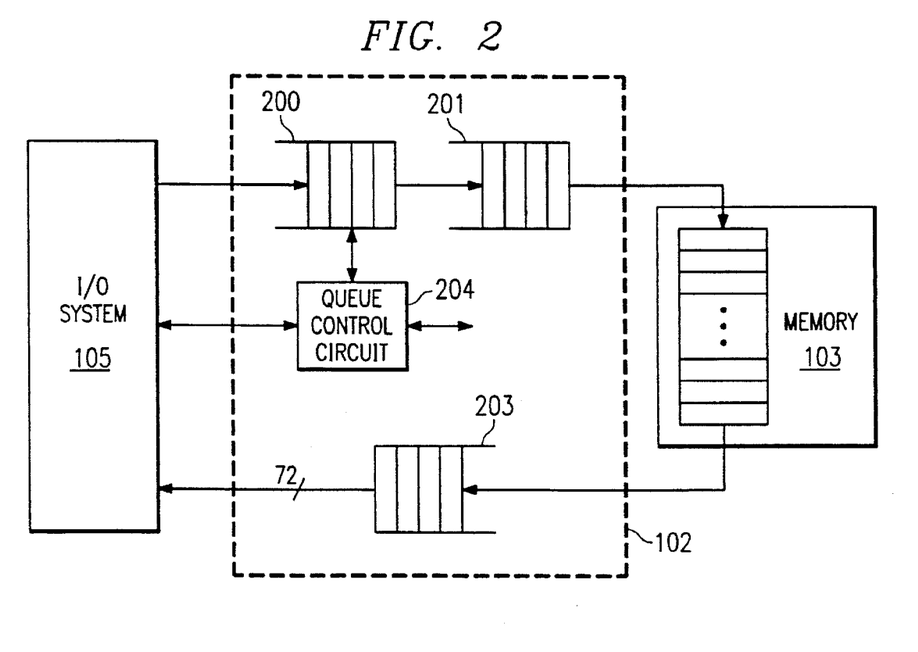
FIG. 2 is a functional block diagram depicting the queuing circuitry coupling the I/O system and memory units shown in FIG. 1.

FIG. 2 is a more detailed functional block diagram emphasizing the interface allowing the transfer of memory requests from I/O system 105 to a selected memory unit 103 and, during a read or read-modify-write, the subsequent transfer of data from the selected memory unit back to I/O system 105. It should be noted that in alternate embodiments, the circuitry of FIG. 2 may also be used to interface the exchange of memory requests and data between a given CPU 101 (or other device) and a selected memory unit 103.

Memory requests output from I/O system 105 are received at the input of an input queue 200, preferably located on crossbar 102. In the illustrated embodiment, I/O system 105 outputs memory requests at a selected clock rate (the I/O output clock rate) which is a multiple of either one, one half or one third of the clock rate at which memory units 103 inputs memory requests (the memory clock rate). When the memory clock rate exceeds the I/O output clock rate, queue 200 queues a selected number of memory requests received at the I/O clock rate, after which the queued requests are output to the selected memory unit 103 as a burst at the memory clock rate.

In the illustrated embodiment, the output of queue 200 is coupled to crossbar queue 201, also preferably located on crossbar 102. Queue 201 is used to hold memory requests output from queue 200 when contention between CPUs 103 and I/O system 105 for access to the same selected memory unit 103 occurs. In the present example, when I/O system 105 has priority to the selected memory unit 103, the memory requests queued in queues 200 and 201 are released as a burst to that memory unit 103 to perform a read, read-modify-write or write as necessary.

In the preferred embodiment queues 200 and 201 are each constructed from one or more gate arrays, with queue 200 having a length of sixteen (i.e. can queue up to sixteen memory requests) and queue 201 having a length of five (i.e. can queue up to five memory requests). During typical operation of the illustrated embodiment of system 100, memory requests are provided to a given memory unit 103 in bursts of sixteen. A burst of this length or greater allows I/O system 105 to obtain a reasonable share of memory bandwidth. Thus, queue 200 typically accumulates eleven requests before outputting them to queue 201 and queue 200 normally accumulates five more requests from I/O system 105 during this time thus sending a burst of sixteen. As will be discussed below, however, the burst length and burst frequency are programmable providing operational flexibility. It should be noted that queue 200 and/or queue 201 may each be constructed of a plurality of parallel queues located on different gate arrays. For example, queue 200 may comprise a data queue disposed on one gate array chip for queuing the data portion of each memory request and an address queue for queuing the address portion of each memory request.

When the memory requests sent to the selected memory unit 103 are read requests, the addressed data words, output from memory after a fixed number of cycles, are sent to a return queue 203, preferably located on crossbar 102. In the preferred embodiment, queue 203 has a length of sixteen and receives data words comprising sixty-four bits of actual data and eight parity bits. Queue 203 receives data from a given memory unit 103 at the memory clock rate and outputs data at the I/O system clock rate. Thus, when memory systems 103 are operating at a clock rate three times that at which I/O system 105 is operating at, the risk of overflowing return queue 203 during a read or read-modify-write is maximized. The risk of queue overflow is compounded in the preferred embodiment because reads and read-modify-writes are performed by bursts of memory requests; if data resulting from a burst of memory requests has not sufficiently cleared queue 203, new data resulting from a subsequent burst of memory requests may quickly overflow queue 203.

According to the principles of the present invention therefore, queue control circuitry 204 is provided to prevent overflows. Queue control circuitry 204 conditions the bursts of memory requests to crossbar 102 and the selected memory 103 such that return queue 203 will not overflow. Advantageously, queue control circuitry 204 prevents return queue overflow without specific knowledge of the state of return queue 203 (this feature is particularly advantageous when queue control circuitry 204 and return queue 203 are disposed such that cross-communication is either physically difficult or slow in time.

Queue control circuitry 204 first controls the maximum size of the bursts of memory requests from I/O system 105 and queues 200 and 201 to memory. This function is necessary because, in general, an input queue(s) with N elements initially queued therein and receiving a new element every A cycles can overflow an empty output queue of length N which receives new elements every cycle and outputs an element every A cycle as demonstrated by the equations:

$$\text{Burst}_{max} = \left\lceil N \frac{A}{A-1} \right\rceil \quad (1)$$

$$\text{Fill}_{max} = \left\lceil \text{Burst}_{max} \frac{A-1}{A} \right\rceil + 1 \quad (2)$$

Thus the maximum fill $\text{Fill}_{max}$ at which output queue 203 of length N will overflow is N+1.

Queue control circuitry 204 also controls the wait time between bursts of memory requests from queue 200. This insures that two or more consecutive read (or read-modify-write) request bursts occur sufficiently apart in time such that queue 203 has sufficient time to empty between the resulting bursts of data words from memory 103. In general, if M elements are sent to a queue in time T and that queue sends out one element every A cycles, the queue will start filling if $(M/T) > (1/A)$. Thus, if B burst elements are sent to the queue in B cycles, the total time must equal or exceed B*A such that the wait time between bursts must be B*(A−1).

Queue control circuitry 204 further accounts for the queuing in both input queue 200 and queue 201 such that the total number of read (or read-modify-write) requests in queues 200 and 201 together does not increase the burst size and cause an overflow of queue 203. Additionally, queue control circuitry 204 is programmable in order to control bursts to memory of different sizes and different I/O operating clock rates.

Figure 3:
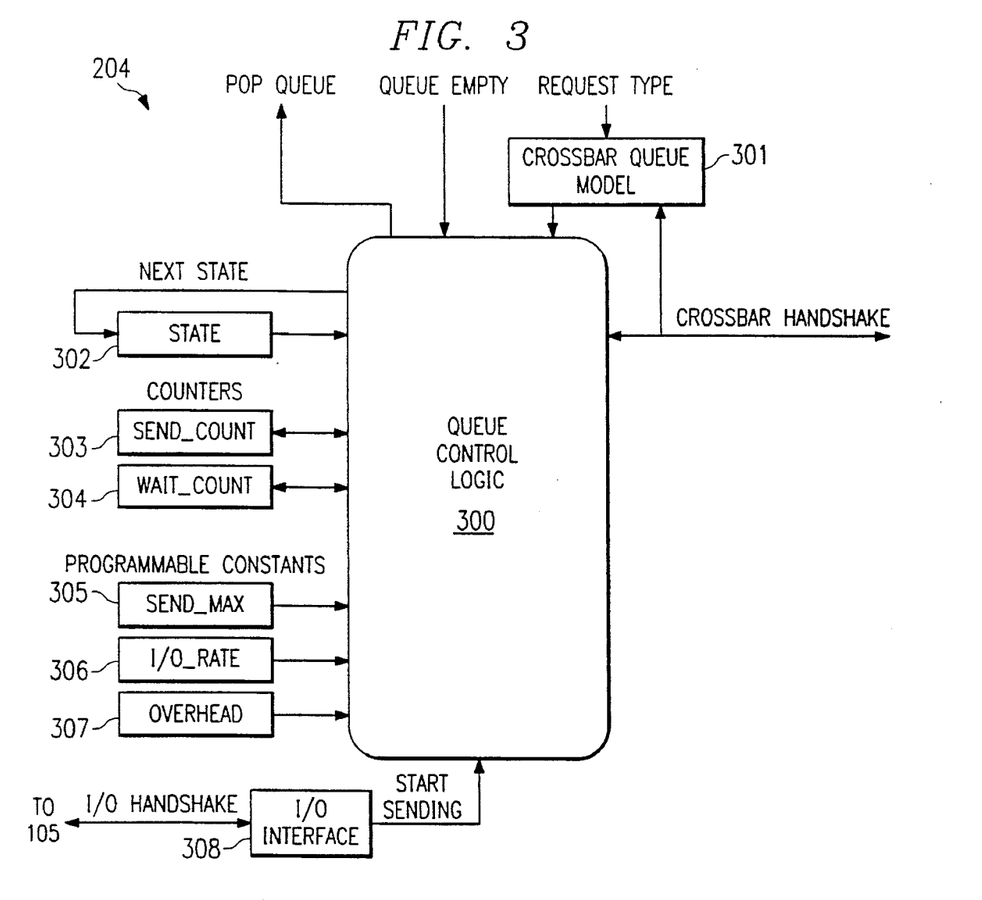
FIG. 3 is a more detailed functional block diagram of the queue control circuitry of FIG. 2.

FIG. 3 is a functional block diagram of queue control circuitry 204. In general, queue control circuitry 204 includes queue control logic 300, crossbar queue model 301, a state register 302, send and wait counters 303 and 304, send max, I/O rate max, and overhead registers 305–307 and I/O interface 308.

While a specific description of the operation of queue control circuitry 204 will be provided further below in connection with FIG. 4, a general description of the functions of the circuitry of FIG. 3 is as follows. Queue control logic 300 is a state machine which operates in accordance with the state diagram of FIG. 4. In the illustrated embodiment, queue control logic 300 is constructed from a plurality of logic gates. In the preferred embodiment, queue control circuitry 300 is constructed as part of a gate array.

Crossbar queue model 301 includes a set of registers which "model" queue 201 by paralleling the registers (storage elements) of crossbar queue 201. In the illustrated embodiment, queue model 301 includes five one-bit request-type registers, which parallel the five registers of queue 201, each of which holds a bit designating whether the corresponding memory request being tracked in queue 201 is a read (read-modify-write) or a write request. The illustrated queue model 301 also includes five registers, also paralleling those of queue 201, each of which holds a bit tracking the input and output of memory requests into and out of queue 201. For example, a logic 1 may be used to represent that the corresponding position in queue 201 holds a memory request and a logic 0 may represent an empty position in queue 201.

Figure 4:
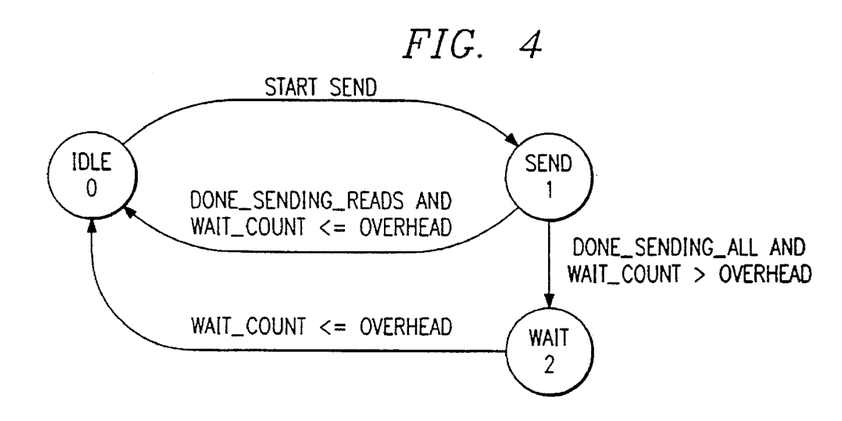
FIG. 4 is a state diagram illustrating the operation of the queue control logic circuitry of FIG. 3.

State register 302 holds a two bit word representing the current state of the three possible states of the state machine queue control logic 300 as shown in FIG. 4. Send counter 303 counts the number of memory requests output to crossbar queue 201. Wait counter 304 is generally used to time the length of wait period between bursts to memory. Send max register 305 is programmed to a value representing the maximum number of memory requests in a burst, which in the illustrated embodiment is typically sixteen. I/O rate register 306 is programmed with a constant equal to (A−1), where I/O system outputs memory requests and inputs read data at a rate of A clock cycles. When I/O system is operating at a clock rate three times slower than that at which the selected memory 103 is operating, A equals three and the I/O rate value consequently equals two. Overhead register 307 is programmed with an overhead constant which will reduce the calculated wait time by an amount proportionate with the overhead time required to send data through queue 201 and reset the state machine of queue control logic 300. Further, additional overhead time which can be factored into the wait time between bursts results from the need to shift from wait to idle before shifting to send during the state machine operation discussed below. In essence, the processing overhead provides a built-in wait time which is factored into the overall calculation of the wait time between bursts. I/O interface transfers handshake commands between I/O system 105 and queue control logic 300 and controls the output of memory requests by I/O system 105.

The operation of queue control logic 300 is depicted in the state diagram of FIG. 4. In general, the wait time between bursts of R read requests is I/O rate*R−overhead, where R is the value set in send max register 305, I/O rate is the value set in I/O rate register 306 and overhead is the value set into overhead register 307.

During the IDLE state (state 0), send counter 303 and wait counter 304 are cleared. When memory requests begin to be transferred from input queue 200 to crossbar queue 201, queue control logic 300 leaves the IDLE state and enters the SEND state (state 1).

In the SEND state, send counter 303 and wait counter 304 are enabled. Send counter 303 increments each time any memory request is sent from queue 200 to a crossbar queue 201. Control signal POP QUEUE enables the output of the next request queued in queue 200. Wait counter 304 increments by the I/O rate value held in I/O rate register 307 each time a read or a read-modify-write request is output to memory from crossbar queue 201 (as modeled by queue model 301). Wait counter 304 decrements each time every other type of memory request, such as a write request, is output from queue 201.

Queue control logic 300 shifts from the SEND state back to the IDLE state when all read (read-modify-write) requests have been sent and the count in wait counter 304 is less than or equal to overhead value held in overhead register 307. All read (read-modify-write) requests have been sent when either the count in send counter 303 equals the value in send max register 305 or input queue 200 is empty, and all read requests have cleared crossbar queue 201. In this case, sufficient time exists for any data output from memory in response to any read requests currently being processed by the selected memory unit 103 to clear return queue 203 before data from a subsequent burst arrives.

Queue control logic 300 shifts from the SEND state to the WAIT state (state 2) when all memory requests have been sent and the count in wait counter 304 is greater than the overhead value held in overhead register 307. All requests have been sent when either the count in send counter 303 equals the value in send max register 305 or input queue 200 is empty, and all requests, regardless of type, have cleared crossbar queue 201.

During the WAIT state, wait counter 304 decrements by one with each memory system clock until the count in wait counter 304 is less than or equal to the overhead count in overhead register 307, at which time processing returns to the IDLE state.

Systems embodying queue overflow protection according to the principles of the present invention have substantial advantages over the prior art. Specifically, the principles of the present invention can be applied to any applications where queues are used to interface circuits and systems operating at different clock rates. In particular, the principles of the present invention are applicable in systems where data and/or control information are transferred in bursts. The programming capability of the illustrated embodiment provides for variations in clock rates, burst size and operational overhead. Additionally, embodiments of the present invention provide for the control of overflows in a queue to which exchange of control information is difficult, because of physical separation and/or separation time-wise.

Although the present invention and its advantages have been described in detail, it should be understood that various changes, substitutions and alterations can be made herein without departing from the spirit and scope of the invention as defined by the appended claims.

What is claimed is:

1. Circuitry for controlling the transfer of memory requests from a requesting device to a particular memory of a plurality of memories, said particular memory operating in response to a memory clock having a memory clock rate comprising:

queuing circuitry comprising:
  a first queue for receiving said memory requests: and
  a second queue coupled in series with said first queue said second queue holding said memory requests when contention for access to said particular memory occurs:
a counter;
control circuitry operable
  in an idle state, clear said counter;
  shift from said idle state to a send state when said queue circuitry starts sending requests to said memory;
  in said send state, increment the count in said counter by a rate value, proportionate to the difference between an input rate at which said queuing circuitry receives memory requests and said memory clock rate, each time a read request is sent from said queuing circuitry to said memory and decrement the count in said counter each time a write request is sent from said queuing circuitry to said memory;
  shift from said send state to said idle state when said queuing circuitry is done sending read memory requests to said memory and the count in said counter is less than or equal to an overhead value representing processing overhead time;
  shift from said send state to a wait state when said queuing circuitry is done sending all memory requests to said memory and the count in said counter is greater than said overhead value;
  in said wait state, decrement the count in said counter by said rate value in response to said memory clock; and
  shift from said wait state to said idle state when the count in said counter decrements to a value less than or equal to said overhead value.

2. The circuitry of claim 1 and further comprising a second counter, said control circuitry further operable to increment the count in said second counter by one each time a memory request is sent from said queuing circuitry to said memory.

3. The circuitry of claim 2 wherein said queuing circuitry is done sending read requests when the count in said second counter is equal to a value representing a number of memory request to be sent to said memory in a burst and all read requests have been sent from said queuing circuitry to said memory.

4. The circuitry of claim 2 wherein said queuing circuitry is done sending all memory requests when the count in said second counter is equal to a value representing a number of said memory requests to be sent to said memory in a burst and all memory requests have been sent from said queuing circuitry to said memory.

5. The circuitry of claim 1 wherein said control circuitry comprises a plurality of logic circuits.

6. The circuitry of claim 1 wherein said control circuitry comprises at least a portion of a gate array.

7. The circuitry of claim 1 wherein said control circuitry comprises a state machine.

8. The circuitry of claim 1 and further comprising queue modeling circuitry for tracking the transfer of said memory requests from said queuing circuitry to said memory.

9. The circuitry of claim 8 wherein said queue modeling circuitry is further operable to track the request type of each memory request transferred from said queuing circuitry to said memory.

10. The circuitry of claim 1 wherein said rate value is equal to said memory clock rate divided by said input clock rate with one deducted from the result.

11. Circuitry for controlling the transfer of memory requests from a requesting device to a particular memory of a plurality of memories, said memory operating in response to a memory clock of a selected rate comprising:

queuing circuitry comprising:
  a first queue for receiving said memory requests; and
  a second queue coupled in series with said first queue for sending said memory requests to said particular memory, said second queue holding said memory requests when contention for access to said particular memory occurs;
a wait counter;
a register for holding an I/O rate value proportionate to the difference between an input rate at which said queuing circuitry receives said memory requests and said memory clock rate;
a register for holding an overhead value representing processing overhead time;
control circuitry operable to:
  in an idle state, clear said wait counter;
  shift from said idle state to a send state when said queuing circuitry starts sending requests to said memory;
  in said send state:
    increment the count in said wait counter by said I/O rate value with each read request send from said queuing circuitry to said memory; and
    decrement the count in said wait counter with each non-read request sen from queuing circuitry to said memory;
  shift from said send state back to said idle state when said queuing circuitry is done sending read requests to said memory and the count in said wait counter is less than or equal to said overhead value;
  shift from send state to a wait state when said queuing circuitry is done sending memory requests to said memory and the count in said wait counter is greater than said overhead value;
  in said wait state, decrement the count in said wait counter with each cycle of said memory clock; and
  shift from said wait state to said idle state when the count in said wait counter decrements to a value less than or equal to said overhead value.

12. The circuitry of claim 11 wherein said I/O rate= (memory clock rate/input clock rate)−1.

13. The circuitry of claim 11 and further comprising:
a send counter;
a register for holding a send value representing a maximum number of said memory requests to be sent to said memory from said queuing circuitry in a burst; and
wherein said control circuitry is further operable to increment the count in said send counter by one with each memory request sent from said queuing circuitry to said memory.

14. The circuitry of claim 11 and further comprising queue modeling circuitry operable to:
track the input and output of memory request to and from said second queue; and
maintain bits indicative of a type of each memory request held in said second queue.

15. The circuitry of claim 14 wherein said queuing circuitry is done sending read requests when the count in said wait counter is equal to said send value and all read requests have been output from said second queue to said memory.

16. The circuitry of claim 14 wherein said queuing circuitry is done sending read requests when said first queue is empty and all read requests have been output from said second queue to said memory.

17. The circuitry of claim 14 wherein said queuing circuitry is done sending all memory requests when the count in said send counter is equal to said send count and all memory requests have been output from said second queue to said memory.

18. The circuitry of claim 14 wherein said queuing circuitry is done sending all memory requests when said first queue is empty and all memory requests have been output from said second queue to said memory.

19. A processing system comprising:
circuitry for generating memory requests at a first clock rate;
input queuing circuitry comprising:
a first queue for receiving said memory requests from said circuitry for generating at said first clock rate; and
a second queue coupled in series with said first queue for holding said memory requests when contention for access to a particular memory unit occurs and for outputting said memory requests at a second clock rate;
a memory system containing said particular memory unit for storing and retrieving data in response to said memory requests, said memory system outputting data at said second clock rate in response to read requests from said input queuing circuitry;
an output queue for receiving data from said memory at said second clock rate and outputting said data at said first clock rate; and
queuing control circuitry associated with said input queuing circuitry for preventing overflows of said output queue by controlling a number of said memory requests sent in bursts from said input queuing system to said memory system and by controlling wait time between ones of said bursts.

20. The system of claim 19 wherein said first clock rate is less than said second clock rate.

21. The system of claim 19 wherein each said memory request includes an address portion and a data portion, said at least one queue comprising parallel address and data queues for queuing said address and data portions respectively.

22. The system of claim 19 wherein said queue control circuitry comprises:
a counter;
control circuitry operable to:
in an idle state, clear said counter;
shift from said idle state to a send state when said input queuing circuitry starts sending requests to said memory;
in said send state, increment the count in said counter by a rate value, proportionate to the difference between said first clock rate and said second clock rate each time a read request is sent from said queuing circuitry to said memory system and decrement the count in said counter each time a read request is not sent from said queuing circuitry to said memory system;

shift from said send state to said idle state when said queuing circuitry is done sending read memory requests to said memory and the count in said counter is less than or equal to an overhead value representing processing overhead time;
shift from send state to a wait state when said queuing circuitry is done sending all memory requests to said memory and the count in said second counter is greater than said overhead value;
in said wait state, decrement the count in said counter in response to said memory clock timing the operation of said memory; and
shift from said wait state to said idle state when the count in said counter decrements to a value less than or equal to said overhead value.

23. The circuitry of claim 22 and further comprising a second counter, said control circuitry further operable to increment the count in said second counter by one each time a memory request is sent from said queuing circuitry to said memory.

24. The circuitry of claim 23 wherein said queuing circuitry is done sending read requests when the count in said second counter is equal to a value representing a maximum number of memory request to be sent to said memory in a burst and all read requests have been sent from said queuing circuitry to said memory.

25. The circuitry of claim 23 wherein said queuing circuitry is done sending all memory requests when the count in said second counter is equal to a value representing a maximum number of said memory requests to be sent to said memory in a burst and all memory requests have been sent from said queuing circuitry to said memory.

26. A method of controlling the transfer of memory requests from queuing circuitry having a first queue coupled in series with a second queue to a memory, the first queue receiving memory requests at a first clock rate and the second queue outputting memory requests at a second clock rate, comprising the steps of:
holding the memory requests in the second queue when contention for access to the memory occurs;
in an idle state, clearing a counter associated with the queuing circuitry;
shifting from the idle state to a send state when the queuing circuitry starts sending requests to said memory;
in the send state, incrementing the count in the counter by a rate value, proportionate to the difference between the first and second clock rates, when a read request is sent from the queuing circuitry to the memory;
in the send state, decrementing the count in the counter when a non-read request is sent from the queuing circuitry to the memory;
shifting from the send state to the idle state when the queuing circuitry is done sending read memory requests to the memory and the count in the counter is less than or equal to an overhead value representing processing overhead time;
shifting from the send state to a wait state when the queuing circuitry is done sending all memory requests to the memory and the count in the counter is greater than the overhead value;
in the wait state, decrementing the count in the counter in response to the memory clock timing the operation of the memory; and
shift from the wait state to the idle state when the count in said counter decrements to a value less than or equal to the overhead value.

27. The circuitry of claim 26 further comprising the step of incrementing the count in a second counter associated with the queuing circuitry by one when a memory request is sent from the queuing circuitry to the memory.

28. The circuitry of claim 27 wherein the queuing circuitry is done sending read requests when the count in the second counter is equal to a value representing a number of memory requests to be sent to the memory in a burst and all read requests have been sent from the queuing circuitry to said memory.

29. The circuitry of claim 27 wherein the queuing circuitry is done sending all memory requests when the count in the second counter is equal to a value representing a number of memory requests to be sent to the memory in a burst and all memory requests have been sent from the queuing circuitry to the memory.

30. A method of controlling a memory comprising the steps of:

generating memory requests at a first clock rate;

inputting the memory requests into an input queue at the first clock rate;

transferring the memory requests to a crossbar queue coupled in series with the input queue;

holding the memos requests in the crossbar queue when contention for access to the memory occurs;

outputting the memory requests from the crossbar queue at a second clock rate;

addressing a memory system with the memory addresses output from the crossbar queue, the memory system outputting at the second clock rate in response to read memory requests;

inputting the data output from the memory into an output queue at the second clock rate;

outputting said data at said first clock rate; and preventing overflows of the output queue by controlling the number of memory requests sent in bursts from the input queue to the memory system and by controlling wait time between the bursts.

* * * * *

UNITED STATES PATENT AND TRADEMARK OFFICE
CERTIFICATE OF CORRECTION

PATENT NO. : 5,590,304
DATED : December 31, 1996
INVENTOR(S) : Richard W. Adkisson It is certified that error appears in the above-identified patent and that said Letters Patent is hereby corrected as shown below:

Title page, item [73], Assignee: delete "Covex" and insert --Convex--.

Column 9, Claim 1, 1.8: After "*requests*" delete the colon ":" amd insert therefore a semicolon -- ; --;

Column 9, Claim 1, 1.9: After "*first queue*" insert a comma -- , --;

Column 9, Claim 1, 1.12: After "*occurs*" delete the colon":" and insert therefor a semicolon -- ; --;

Column 9, Claim 1, 1.14: After "*operable*" insert therefor -- *to:* --.

Signed and Sealed this

Sixth Day of February, 2001

*Attest:*

Q. TODD DICKINSON

*Attesting Officer*   *Director of Patents and Trademarks*